(12) United States Patent
Hong et al.

(10) Patent No.: US 7,941,709 B1
(45) Date of Patent: May 10, 2011

(54) FAST CONNECTIVITY RECOVERY FOR A PARTITIONED NAMESPACE

(75) Inventors: Bo Hong, Mountain View, CA (US); John A. Colgrove, Los Altos, CA (US); Feng Wang, Sunnyvale, CA (US); Oleg Kiselev, Palo Alto, CA (US)

(73) Assignee: Symantec Corporation, Mountain View, CA (US)

( * ) Notice: Subject to any disclaimer, the term of this patent is extended or adjusted under 35 U.S.C. 154(b) by 287 days.

(21) Appl. No.: 12/204,486

(22) Filed: Sep. 4, 2008

Related U.S. Application Data

(60) Provisional application No. 60/976,322, filed on Sep. 28, 2007.

(51) Int. Cl.
*G06F 11/00* (2006.01)

(52) U.S. Cl. .......................................... 714/54

(58) Field of Classification Search ..................... 714/54
See application file for complete search history.

(56) References Cited

U.S. PATENT DOCUMENTS

| | | | |
|---|---|---|---|
| 5,828,876 A | 10/1998 | Fish et al. | |
| 5,875,444 A | 2/1999 | Hughes | |
| 6,058,400 A | 5/2000 | Slaughter | |
| 7,093,086 B1 | 8/2006 | van Rietschote | |
| 7,506,213 B1 * | 3/2009 | Cabrera et al. | 714/42 |
| 7,689,599 B1 * | 3/2010 | Shah et al. | 714/19 |
| 2007/0067256 A1 * | 3/2007 | Zayas et al. | 707/1 |
| 2008/0189343 A1 * | 8/2008 | Hyer et al. | 707/205 |

* cited by examiner

*Primary Examiner* — Michael C Maskulinski
(74) *Attorney, Agent, or Firm* — Rory D. Rankin; Meyertons, Hood, Kivlin, Kowert, Goetzel, P.C.

(57) ABSTRACT

A system and method for storing data. In one embodiment, a file system includes a hierarchy of nodes partitioned into a plurality of containers. The file system further includes metadata associated with each node. First metadata describes each node's references to other nodes and second metadata identifies each node's parent node. The file system further includes a linkage table associated with each container. Each linkage table comprises entries describing links between a node owned by the associated container and other nodes. In response to detecting that a file system error has occurred, the file system identifies a container which corresponds to the detected error, corrects inconsistencies between the first and second metadata associated with each node owned by the container, and corrects inconsistencies between each of the entries of the linkage table associated with the identified container and the first and second metadata.

20 Claims, 15 Drawing Sheets

File System Directory 410

| Name | Inode ID | Container Reference | Directory/File | References | | |
|------|----------|---------------------|----------------|------------|---|---|
| 220  | 320      | 312                 | Dir            | 221        | 222 |   |
| 221  | 321      | 312                 | File           |            |     |   |
| 222  | 322      | 312                 | Dir            | 241        | 242 | 231 |
| 241  | 341      | 312                 | File           |            |     |   |
| 242  | 342      | 312                 | File           |            |     |   |
| 230  | 330      | 314                 | Dir            | 232        | 233 | 242 |
| 231  | 331      | 314                 | File           |            |     |   |
| 232  | 332      | 314                 | File           |            |     |   |
| 233  | 333      | 314                 | File           |            |     |   |
| 250  | 350      | 316                 | Dir            | 252        | 251 | 262 |
| 252  | 352      | 316                 | Dir            | 261        | 262 |   |
| 251  | 351      | 316                 | File           |            |     |   |
| 261  | 361      | 316                 | File           |            |     |   |
| 262  | 362      | 316                 | File           |            |     |   |

FIG. 5

| Container 312 Inode Directory 710 ||||| |
|---|---|---|---|---|
| Inode ID | Link Count | Parent Inode | Subdirectory Field | Container ID |
| 320 | 2 | 310 | yes | 312 |
| 321 | 1 | 320 | no | 312 |
| 322 | 1 | 320 | yes | 312 |
| 341 | 1 | 322 | no | 312 |
| 342 | 2 | 322 | no | 312 |

| Container 314 Inode Directory 720 ||||| |
|---|---|---|---|---|
| Inode ID | Link Count | Parent Inode | Subdirectory Field | Container ID |
| 330 | 2 | 310 | yes | 314 |
| 331 | 1 | 322 | no | 314 |
| 332 | 1 | 330 | no | 314 |
| 333 | 1 | 330 | no | 314 |

| Container 316 Inode Directory 730 ||||| |
|---|---|---|---|---|
| Inode ID | Link Count | Parent Inode | Subdirectory Field | Container ID |
| 350 | 1 | 310 | yes | 316 |
| 352 | 1 | 350 | yes | 316 |
| 351 | 1 | 350 | no | 316 |
| 361 | 1 | 352 | no | 316 |
| 362 | 2 | 350 | no | 316 |

FIG. 7

FAST CONNECTIVITY RECOVERY FOR A PARTITIONED NAMESPACE

CROSS REFERENCE TO RELATED APPLICATIONS

This application claims the benefit of priority to U.S. Provisional Patent Application No. 60/976,322, entitled "Fast Connectivity Recovery for a Partitioned Namespace," filed Sep. 28, 2007, the entirety of which is incorporated herein by reference.

BACKGROUND OF THE INVENTION

1. Field of the Invention

This invention relates to computer systems and, more particularly, to resource management of file systems within computer systems.

2. Description of the Related Art

Computer file storage systems are becoming increasingly large, consuming increasingly large amounts of resources and presenting scalability problems for a variety of file system operations. In particular, in conventional file systems, the amount of time needed to repair a damaged file system may, at best, grow proportionately with the size of file system metadata. While repairs are taking place, most file system designs require having the file system taken offline, resulting in unacceptably long periods during which the stored files are not accessible.

One reason repairing a damaged file system is so time-consuming is that resources are allocated globally and without constraint. Therefore, an error may affect any portion of the file system, necessitating exhaustive consistency checking. In other words, the fault domain may be the entire file system. To support utilities such as the well know File System Consistency Checker (FSCK), global metadata tracking tables may have to be maintained. During operation of FSCK, these tracking tables must be accessible. Consequently, stress is placed on the virtual memory subsystem and it may be difficult to parallelize consistency-checking operations. If a large file system is partitioned into many smaller file systems, repair of one of the smaller systems may be faster. However, creating a large number of small file systems may result in creating unacceptable management overhead and the semantics of a single file system may be lost. A variety of techniques may be employed to reduce the time needed to run FSCK-like utilities. However, some types of errors, such as those caused by software bugs or outside agencies may still require time-consuming consistency checking. In view of the above, effective systems and methods for managing the resources of a file system are desired.

SUMMARY OF THE INVENTION

Various embodiments of a computer file system and methods are disclosed. In one embodiment, a computer file system includes a hierarchy of nodes partitioned into a plurality of containers. In one embodiment, a container is a dynamically created, variable-sized portion of a file system that includes a number of allocated units of data storage and associated units of metadata storage. The file system further includes first and second metadata associated with each node. The first metadata describes each node's references to other nodes and the second metadata identifies each node's parent node. The file system further includes a linkage table associated with each container. Each linkage table comprises a plurality of entries, each entry describing a link between a node owned by the associated container and another node. In response to detecting that a file system error has occurred, the file system is configured to identify a first container which corresponds to the detected error, correct inconsistencies between the first and second metadata associated with each node owned by the first container, and correct inconsistencies between each of the plurality of entries of the linkage table associated with the identified container and the first and second metadata. In various embodiments, inconsistencies in metadata associated with nodes exclusively owned by the first container may be corrected independently of and in parallel with correcting inconsistencies in metadata associated with nodes exclusively owned by other containers.

In a further embodiment, the first metadata comprises a plurality of entries. Each entry corresponds to one of the nodes of the hierarchy of nodes and includes a field having a first value if the corresponding node is a file node and a second value if the corresponding node is a directory node. If the corresponding node is a directory node, the first metadata further comprises one or more references to other nodes of the hierarchy of nodes. The second metadata comprises a plurality of inodes. Each node of the hierarchy of nodes is associated with a respective one of the plurality of inodes. Each inode comprises a parent reference and a mode field having a first mode value if the associated node is a file node and a second mode value if the associated node is a directory node. To correct inconsistencies between the first and second metadata, the file system is configured to replace at least one of the value of the field and the value of the mode field in response to determining that the value of the field does not match the value of the mode field. To correct inconsistencies between the first and second metadata, the file system is further configured to detect the value of a given inode's parent reference, detect that the first metadata associated with the node to which the parent reference refers does not contain a reference to the node that is associated with the given inode, and add a reference to the node that is associated with the given inode to the first metadata associated with the node to which the parent reference refers.

In a still further embodiment, each of the plurality of entries is associated with a respective one of the plurality of inodes. The linkage table includes a link for each reference to a file other than a parent reference and a link for each reference between a directory and a node not owned by the associated container. Each inode further comprises a link count. If a given inode corresponds to a given file in the file system, the link count of the given inode indicates the number of file system directories that refer to the given file. If the given inode corresponds to a given file system directory, the link count of the given inode indicates the number of file system subdirectories that are linked to the given file system directory. To correct inconsistencies between each of the plurality of entries of the linkage table associated with the identified container and the first and second metadata, the file system is configured to, for a given inode, increase the link count in response to determining that the number of links in the linkage table associated with the given inode is greater than the link count minus one, and decrease the link count in response to determining that the number of links in the linkage table associated with the given inode plus the number of additional links associated with the given inode that are present in other container linkage tables or in the first metadata is less than the link count minus one.

These and other embodiments will become apparent upon consideration of the following description and accompanying drawings.

BRIEF DESCRIPTION OF THE DRAWINGS

FIG. 5 illustrates one embodiment of the contents of a file system directory that corresponds with logical namespace.

FIG. 7 illustrates one embodiment of the contents of a set of container inode directories that corresponds with inodes owned by a set of containers.

Figure 1:
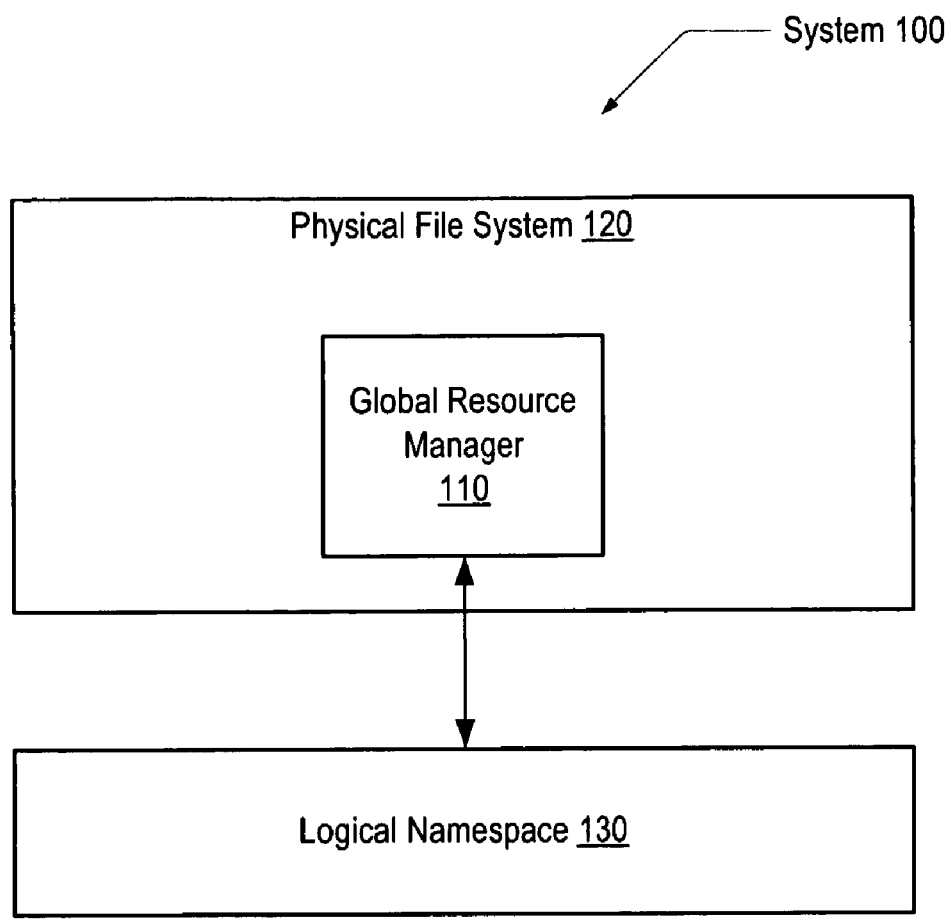
FIG. 1 illustrates one embodiment of a computer system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 illustrates one embodiment of a computer system 100. As shown, system 100 includes a physical file system 120 and a logical namespace 130. Physical file system 120 may include a global resource manager 110 coupled to logical namespace 130. In an alternative embodiment, global resource manager 110 may be a stand-alone component. Physical file system 120 may comprise one or more data storage devices such as hard disks or CD-ROMs, etc. Conventionally, physical file system 120 may be further coupled to one or more processing elements (not shown) or other standard computer system components.

Global resource manager 110 may be responsible for allocating resources of physical file system 120 such as inodes, blocks, or other physical units of metadata and data storage. Global resource manager 110 may also maintain data structures that track resource allocation. In addition, global resource manager 110 may track the status of physical file system 120 and detect and correct errors that may arise due to aborted operations, software bugs, sudden power interruption, etc. Global resource manager 110 may be implemented in hardware, software, or a combination thereof.

Figure 2:
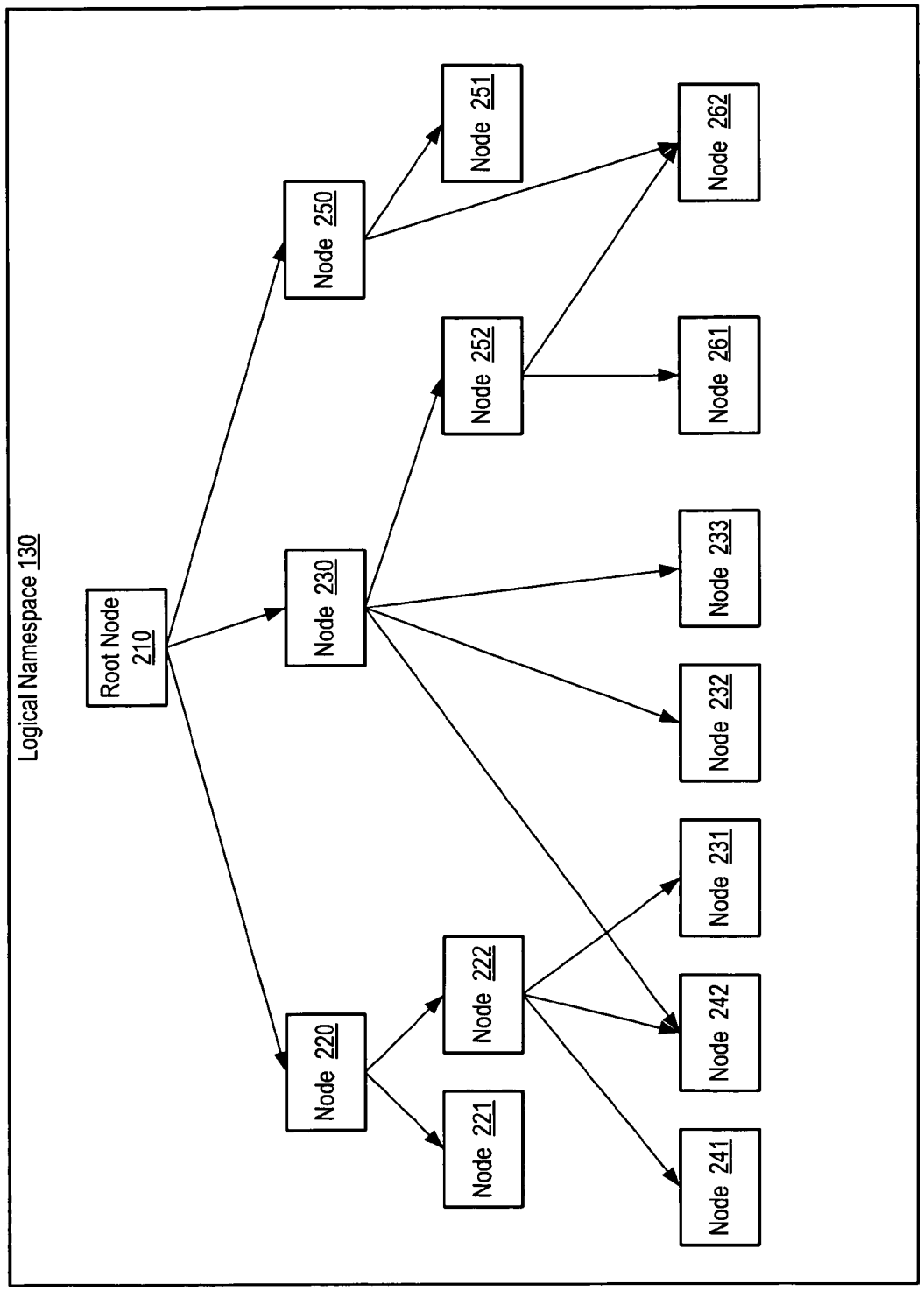
FIG. 2 illustrates one embodiment of logical namespace.

FIG. 2 illustrates one embodiment of logical namespace 130. In the illustrated embodiment, namespace 130 begins with a root node 210 and includes nodes 220-222, 230-233, 241, 242, 250-252, 261, and 262. Nodes 220, 230, and 250 may be linked to root node 210, nodes 221 and 222 may be linked to node 220, nodes 231, 241, and 242 may be linked to node 222, nodes 232, 233, and 252 may be linked to node 230, node 261 may be linked to node 252, and nodes 251 and 262 may be linked to node 250. In addition, node 242 may be linked to node 230, and node 262 may be linked to node 252. Nodes may be linked in a hierarchy of levels. For example, nodes 220, 230, and 250 may form a second level of a hierarchy, nodes 221, 222, 251 and 252 a third level, etc. In alternative embodiments, namespace 130 may include many more nodes and many more levels than the ones shown in FIG. 2, including less than or more than two nodes linked to the root node.

During operation, when files are stored in system 100, a user may select a target location within logical namespace 130. The target location in logical namespace 130 may be mapped to a physical location in file system 120. Global resource manager 110 may manage the allocation of resources within file system 120 and perform maintenance operations such as detecting and correcting metadata errors and other inconsistencies in file system 120 according to processes that will be described further below.

Figure 3:
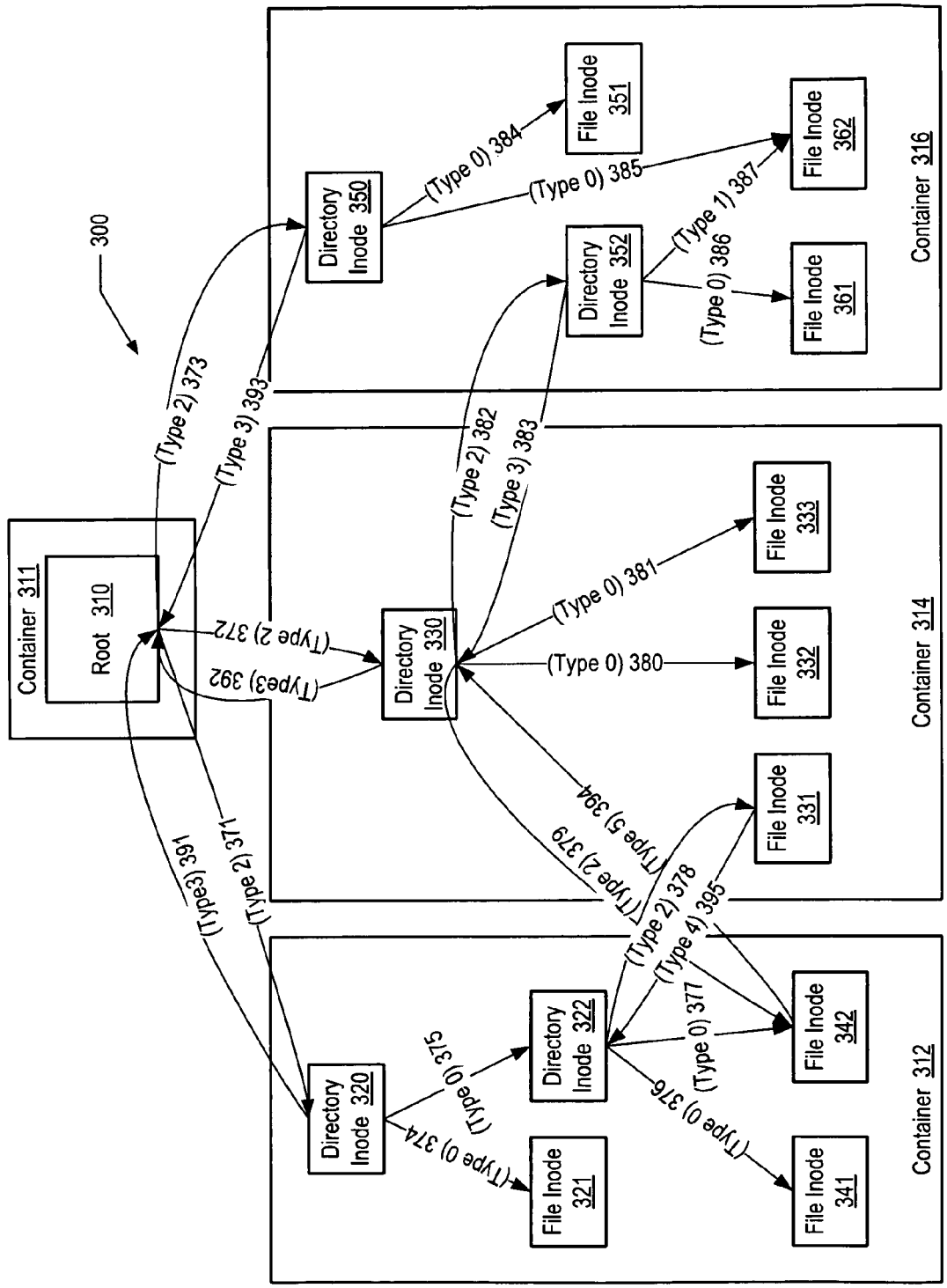
FIG. 3 illustrates one embodiment of metadata resources describing a partitioned file system.

Turning now to FIG. 3, one embodiment of metadata resources 300 describing a partitioned file system is shown. The illustrated resources may be mapped to the logical namespace 130 illustrated in FIG. 2. In the illustrated embodiment, root node 310 and inodes 320-322, 330-333, 341, 342, 350-352, 361, and 362 are shown which correspond to logical namespace nodes 210, 220-222, 230-233, 241, 242, 250-252, 261, and 262, respectively. Also, the inodes of FIG. 3 may be partitioned into containers 311, 312, 314, and 316. In one embodiment, a container is a dynamically created, variable-sized portion of a file system that includes a number of allocated units of data storage and associated units of metadata storage. In a further embodiment, data may be stored in blocks and associated metadata may be stored in inodes. Containers may be used to isolate ownership of inodes and blocks. For example, inodes in a container may only reference blocks in the same container. In the illustrated embodiment, for example, inodes 320, 321, 322, 341, and 342 may be part of container 312, inodes 330-333 may be part of container 314, and inodes 350, 351, 352, 361, and 362 may be part of container 316. In one embodiment, containers may be connected via links if a particular condition is detected such as the first container not having sufficient resources for the additional stored data. Such a condition may be referred to as an overflow and the second container referred to as a linked container. For example, in one embodiment, a linked container may be added when adding more storage to the first container would require it to manage more than a pre-determined maximum number of storage units, objects, files, etc. In various embodiments, the criteria defining whether resources are sufficient may include any desired criteria instead of or in addition to availability of storage resources and may be determined by policy, dynamically by user input, or by any other desired means. Although only four containers are shown in metadata 300, more or fewer containers may be included in alternative embodiments.

In addition to being part of a container, inodes may be linked to other inodes or to the root node by one or more links. Each link may be described as being one of six types, depending on whether the inode is a directory inode or a file inode and whether the link is internal to a container or crosses between containers. A type 0 link is connects a first directory to a second directory or to a file that is in the same container and that has a return reference to the first directory indicating that the first directory is its parent. For example, links 371-377, 380, 381, and 384-386 in the illustrated embodiment are type 0 links. A type 1 link is an extra link to a file from a directory that is in the same container and that does not have a return reference to the directory indicating that the directory is its parent. In other words, the file has another directory as its parent. For example, link 387 in the illustrated embodiment is a type 1 link. A type 2 link is an outbound link from a directory to a subdirectory or file in a different container. For example, link 382 in the illustrated embodiment is a type 2 link. A type 3 link is an inbound link between two directories in different containers. For example, link 383 in the illustrated embodiment is a type 3 link. In one embodiment links between directories in different containers are always bidirectional, that is, a type 2 link to a directory is always paired with a type 3 link. A type 4 link is a return link from a file to a directory that is in a different container indicating that the directory is its parent. For example, link 395 in the illustrated embodiment is a type 4 link. A type 5 link is an inbound link from a file in a different container that does not have a return reference to the directory indicating that the directory is its parent. In other words, the file has another directory as its parent. For example, link 394 in the illustrated embodiment is a type 5 link. Type 2, 3, 4, and 5 links may sometimes be referred to as cross-container references. It is noted that a directory may only be referenced by one directory, but a file may be referenced by any number of directories. Nevertheless, both files and directories have only one parent that may be defined as the directory for which the file or directory has a back reference in its inode.

During an error recovery operation, file system errors may be discovered and repaired through a link-checking process that will be described in greater detail below. A number of data structures may be kept to enable error tracking including a file system directory describing the logical namespace's hierarchy, a container inode directory for each container that captures the ownership and status of each container's inodes, and a container linkage table that tracks cross-container references and extra hard links to files within a container. These data structures may contain a sufficient amount of redundant metadata to enable error correction and file system recovery. FIGS. 4, 5, 6, 7, and 8 and the accompanying descriptions provide details of one embodiment of such data structures in which the unit of metadata is an inode. In alternative embodiments, any of a variety of metadata units may be used instead of inodes.

In many cases, errors may be confined to a single container and an error-correcting scan of the data structures associated with that container may be sufficient to permit file system recovery. Generally speaking, if an error is detected in a particular container, the metadata for each of the files stored in that container may be checked and any errors corrected. In addition, any links between the particular container and other containers may be checked. If one or both sides of a bidirectional link are not valid, then the link may be repaired and the container to which the link connects may be selected. The newly selected container and its links may be checked in a similar manner until no bidirectional link errors are detected. When there are no remaining link errors, the recovery process is complete.

Figure 4:
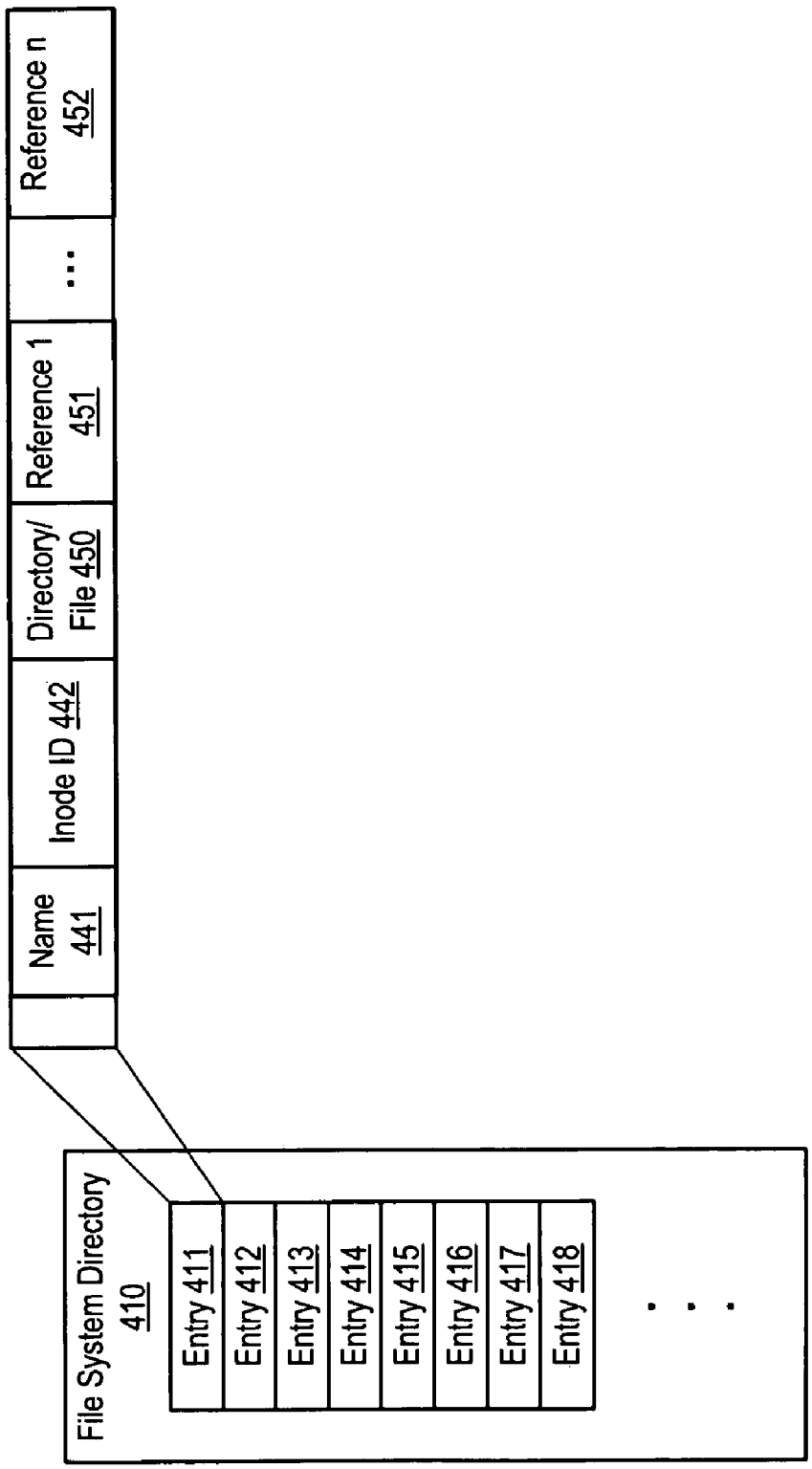
FIG. 4 illustrates one embodiment of a file system directory.

FIG. 4 illustrates one embodiment of a file system directory 410. In the illustrated embodiment, directory 410 includes entries 411-418, etc. Each entry includes a set of fields, such as those illustrated for entry 411. In particular, entry 411 includes a name field 441, an inode ID field 442, a container reference field 444, a directory/file field 450, and zero or more references 451, 452, etc. Name field 441 specifies a name by which a corresponding node of the file system's logical namespace may be identified. Inode ID field 442 includes an identifier of an inode that corresponds to the node of the file system's logical namespace. Container reference field 444 includes an identifier of the container that owns the node with which the entry is associated and may be used as a reference to the container's associated inode directory. Directory/file field 450 may be given a first value to indicate that the corresponding node is a directory node and a second value to indicate that the corresponding node is a file node. If the node is a directory node, references 451, 452, etc may be pointers to subdirectories or files referenced by the corresponding directory node. Conventionally, and in the illustrated embodiment in particular, file nodes include no references to other nodes.

FIG. 5 illustrates one embodiment of the contents of a file system directory 410 that corresponds with logical namespace 130. Each row of file system directory 410 may be an entry that includes the fields described in FIG. 4. For example, the top row includes node 220 that is owned by container 312 that corresponds to inode 320, and is a directory with references to nodes 221 and 222. Each row of directory 410 that corresponds to a directory node may be interpreted in a similar fashion. As noted above, file nodes include no references to other nodes. Accordingly, the second row includes node 221 that corresponds to inode 321 and is a file with no references to other nodes. Each row of directory 410 that corresponds to a file node may be interpreted in a similar fashion.

Figure 6:
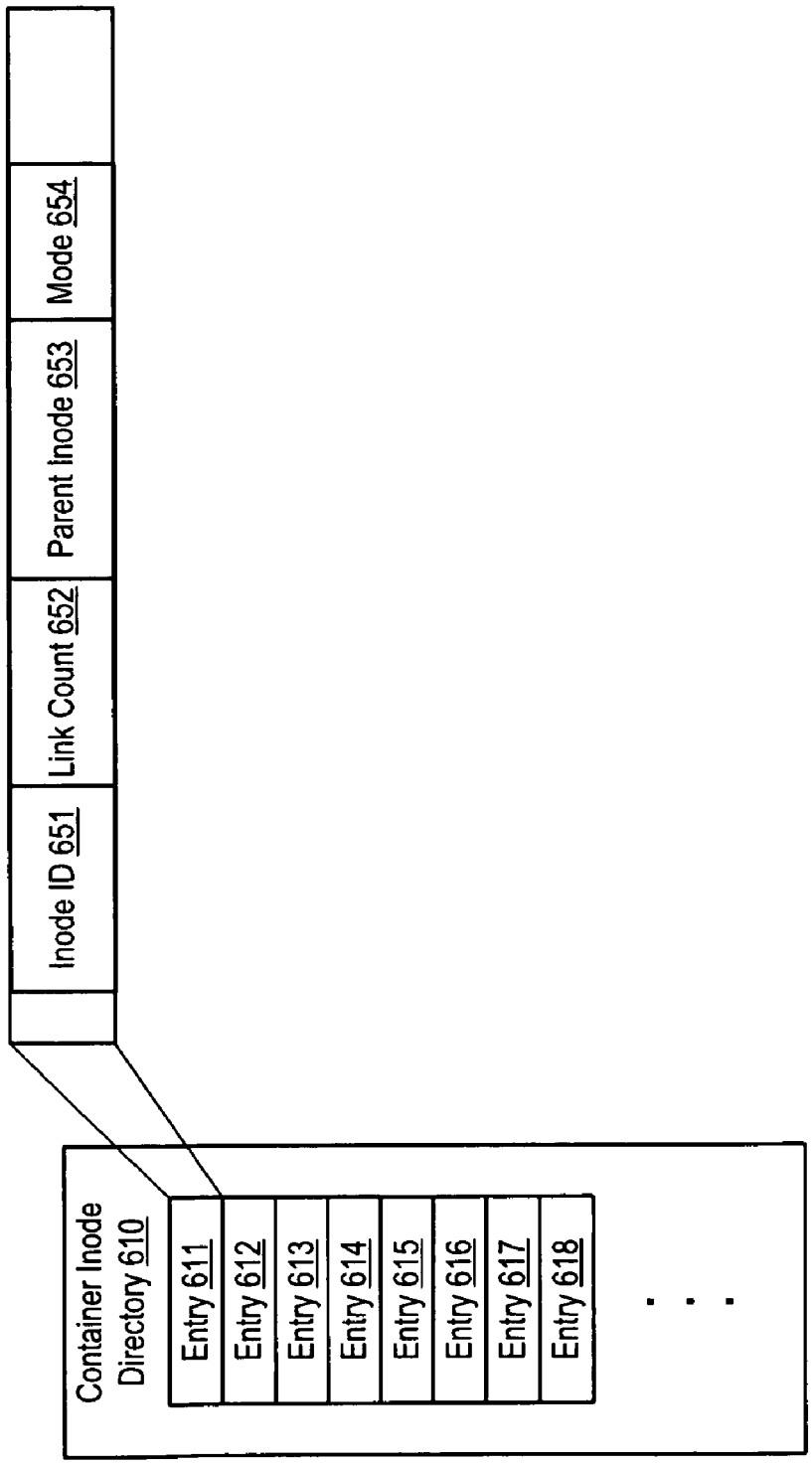
FIG. 6 illustrates one embodiment of a container inode directory.

FIG. 6 illustrates one embodiment of a container inode directory 610. In the illustrated embodiment, directory 610 includes entries 611-618, etc. Each entry includes a set of fields, such as those illustrated for entry 611. In particular, entry 611 includes an inode ID field 651, a link count field 652, a parent inode field 653, and a mode field 654. Inode ID field 651 includes an identifier of the corresponding inode. If the inode corresponds to a file, the link count field 652 may have a value equal to the number of directories that point to the file. If the inode corresponds to a director, the link count field 652 may have a value equal to one plus the number of subdirectories that the directory points to. Parent inode field 653 may include an identifier of the corresponding inode's parent inode. Inode field 654 may be given a first value to indicate that the corresponding inode is a file inode and a second value to indicate that the corresponding inode is a directory inode.

FIG. 7 illustrates one embodiment of the contents of a set of container inode directories 710, 720, and 730 that correspond with inodes owned by containers 312, 314, and 316, respectively. Each row of the inode directories is an entry that includes the fields described in FIG. 6 as well as a field containing the container ID. For example, the top row of directory 710 includes inode 320 that has a link count of 2, indicating that there is 1 subdirectory of the directory that corresponds to inode 320. The parent inode of inode 320 is inode 310. Inode 320 is a directory as indicated by a yes value in the subdirectory field and is owned by container 312. Each additional row of directory 710 and each row of directories 720 and 730 may be interpreted in a similar fashion.

Figure 8:
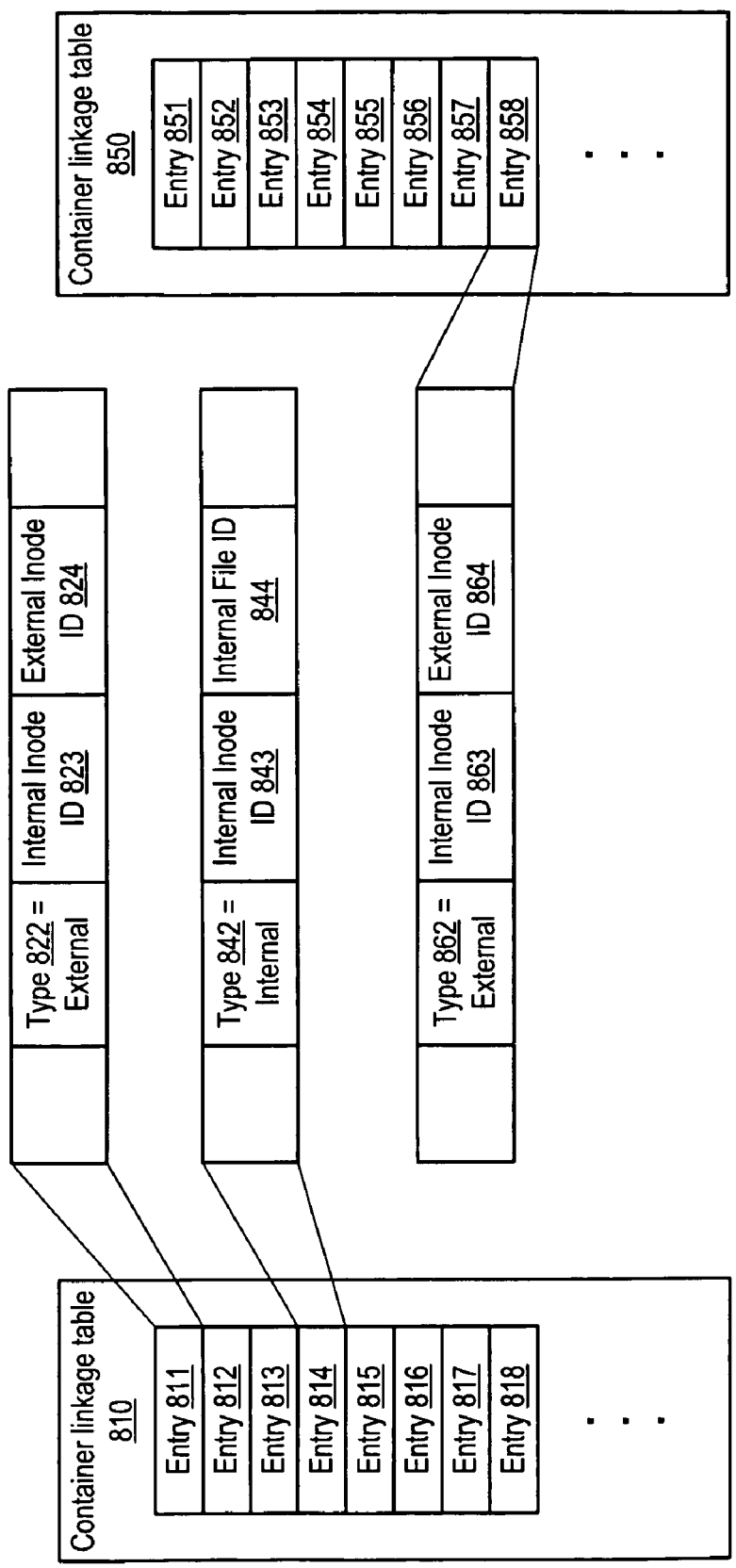
FIG. 8 illustrates one embodiment of container linkage tables that may be used to manage containers and their associated links.

FIG. 8 illustrates one embodiment of container linkage tables 810 and 850 that may be used to manage containers and their associated links. Each container may be associated with its own container linkage table. Table 810 may include entries 811-818, etc., and may be associated with a first container. Similarly, table 850 may include entries 851-858, etc., and may be associated with a second container. Each entry may include a type field, and two additional fields. For example, entry 811 may include type 822, an internal inode ID 823, and an external inode 824. Type 822 has a value of external, indicating that internal inode 823 references an inode in another container, identified by external inode ID 824. If there are no errors or metadata mismatches in the file system, a corresponding second entry will be present in another container linkage table, such as table 850, which in this case includes a matching entry 858. Entry 858 includes type 862, which has a value of external, indicating that internal inode 863 references an inode in another container, identified by external inode ID 864. In this case, internal inode ID 863 has the same value as external inode ID 824 of entry 811, and external inode ID 864 has the same value as internal inode ID 823 of entry 811. Also shown is entry 814 including type 842, an internal inode ID 843, and an internal file ID 844. Type 822 has a value of internal, indicating that internal inode 843 references a file within the same container, identified by internal file ID 844. Unlike entries 811 and 858 that form a bidirectional pair, entry 814 does not have a matching entry in another container linkage table. Rather, entry 814 indicates an extra hard link between a file and a directory in the same container. In one embodiment, all files have at least one link to one directory, but may have additional links to other directories. Each additional link may be tracked via an entry such as entry 814 in table 810. During repair operations, a global resource manager may make use of the redundancies that exist in matching pairs of entries to determine the proper state of file system metadata.

Figure 9:
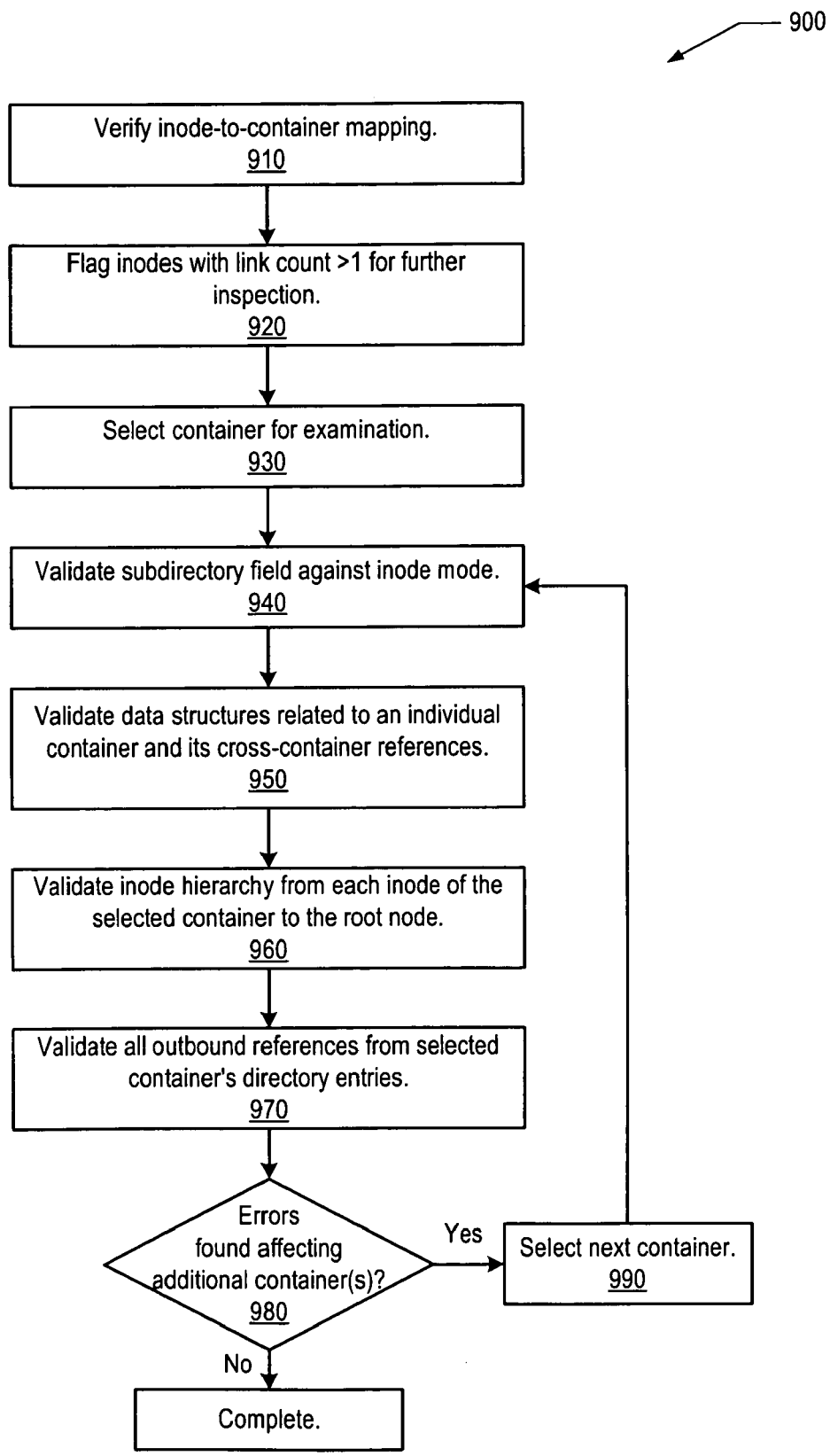
FIG. 9 illustrates one embodiment of a process that may be used to recover connectivity among nodes of a file system.

FIG. 9 illustrates one embodiment of a process 900 that may be used to recover connectivity among nodes of a file system. It may be assumed that during process 900, the file system has been placed in a quiescent state. The recovery process may use processes similar to those used in the well-known FSCK operation, although only a portion of the file system is checked. Consequently, this process may be referred to as a "partial-FSCK." Process 900 may begin with verification of which inodes are mapped to or owned by which containers (block 910). More specifically, in one embodiment, metadata describing which containers own which inodes may be scanned to determine the ranges of inodes to be verified for each container. Conflicts in inode ownership may be resolved in this phase using any of a variety of techniques. For example, a process for verifying the mapping of inodes to containers has been described in a prior application Ser. No. 11/772,036 entitled "Resource Management for Scalable File System Recovery" and is incorporated herein by reference in its entirety. During the inode mapping, inodes that have a link count greater than one may be flagged for further inspection (block 920). Once the mapping of inodes to containers has been established, a container may be selected for examination (block 930). For each inode in the selected directory, the subdirectory field of the corresponding file system directory entry may be validated against the inode mode field in the inode directory (block 940). Mode field validation permits confirmation that both the file system directory and the inode directory agree as to which nodes in the logical namespace are files and which nodes are directories. A detailed description of one embodiment of a process that may fulfill the functions of block 940 is given below. Next, data structures that are related to the selected container as well as cross-container references to and from the selected container may be validated (block 950). Once these data structures have been validated, additional validation of the inode hierarchy extending from each inode of the selected container back to the root node of the file system may also be validated (block 960). Next outbound references from the selected container's file system directory entries to external files and directories may be validated (block 970). Detailed descriptions of individual embodiments of processes that may fulfill the functions of blocks 950, 960, and 970 are also given below. Once the validations both inside the selected container and crossing the container boundary have been validated and errors corrected, if errors are found that affect additional containers (decision block 980), a next one of the additional containers may be selected (block 990) and the validations of blocks 940, 950, 960, and 970 repeated. Once there are no remaining errors affecting other containers (decision block 980), process 900 is complete. It is noted that in alternative embodiments, the individual blocks illustrated in process 900 and in its sub-processes that are described in detail below may be executed in a different order and/or that some blocks may be executed in parallel with others.

In alternative embodiments, other metadata may be used in a recovery process. For example, the validations of processes 950, 960, and 970 may use the container reference field in the file system directory to locate and cross check inode ownership and inode state in the corresponding container's inode directory. In this way, additional redundant information about the inode ownership may be used to repair metadata errors.

Figure 10:
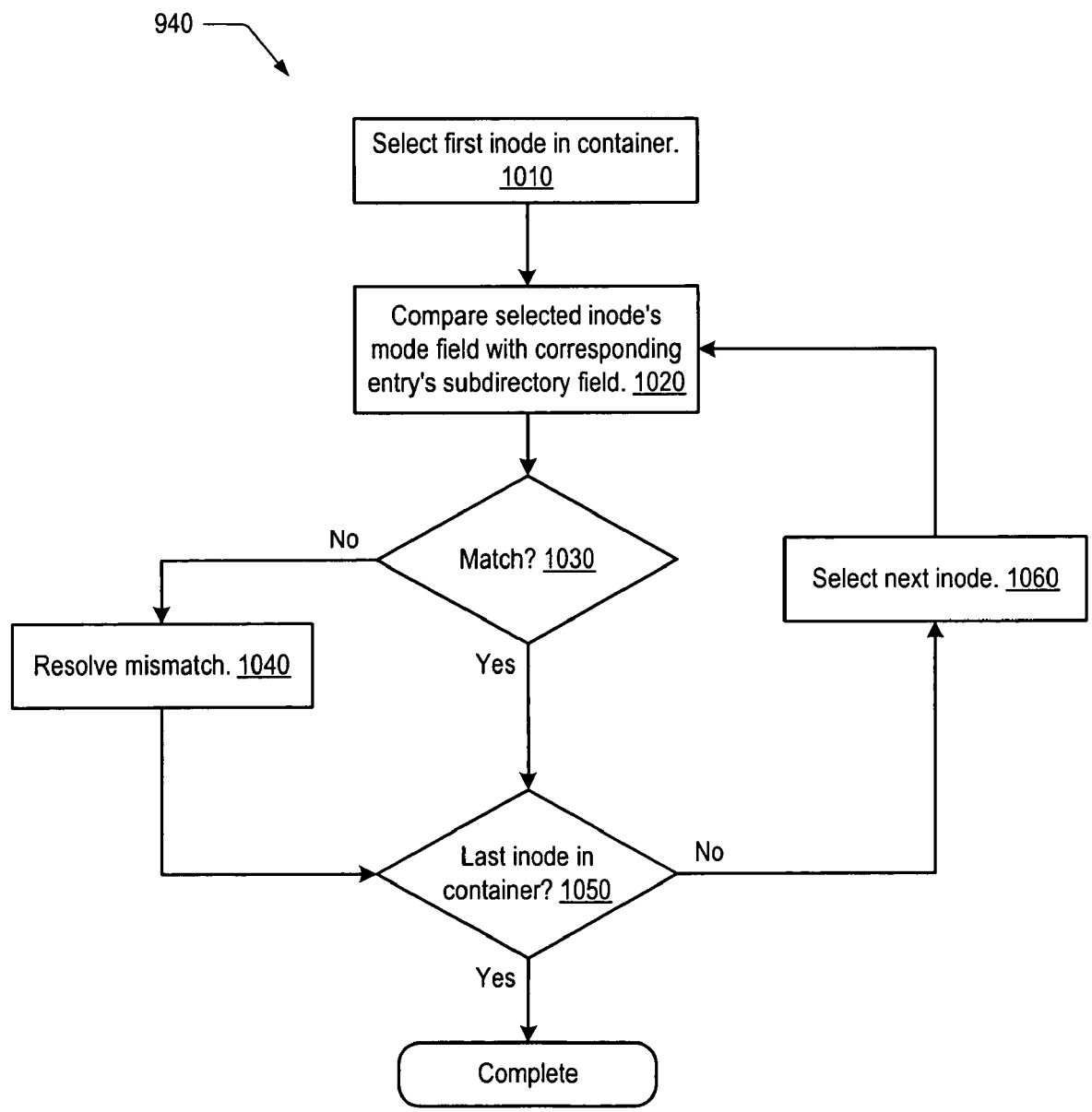
FIG. 10 illustrates one embodiment of a process that may be used to validate the subdirectory field of each entry in the selected container's file system directory against a corresponding inode in the selected container's inode directory.

FIG. 10 illustrates one embodiment of a process 940 that may be used to validate the subdirectory field of each entry in the selected container's file system directory against a corresponding inode in the selected container's inode directory. Process 940 may begin with selection of a first inode in the selected container (block 1010). The selected inode's mode field may be compared with the subdirectory field in the corresponding file system directory entry (block 1020). If the mode and subdirectory values do not match (decision block 1030), the mismatch may be resolved (block 1040) via one of a variety of processes. For example, in one embodiment, the value of the inode mode field may be given precedence. Alternatively, the subdirectory value may be preferred or a user may be alerted and asked for input to resolve the mismatch, etc. Once the mismatch has been resolved or if the mode and subdirectory values are a match, the inode directory may be checked to determine if the selected inode is the last inode of the container that is being verified (decision block 1050). If the selected inode is not the last inode, another inode may be selected (block 1060) and flow may return to block 1020. If the selected inode is the last inode, process 940 is complete.

Figure 11:
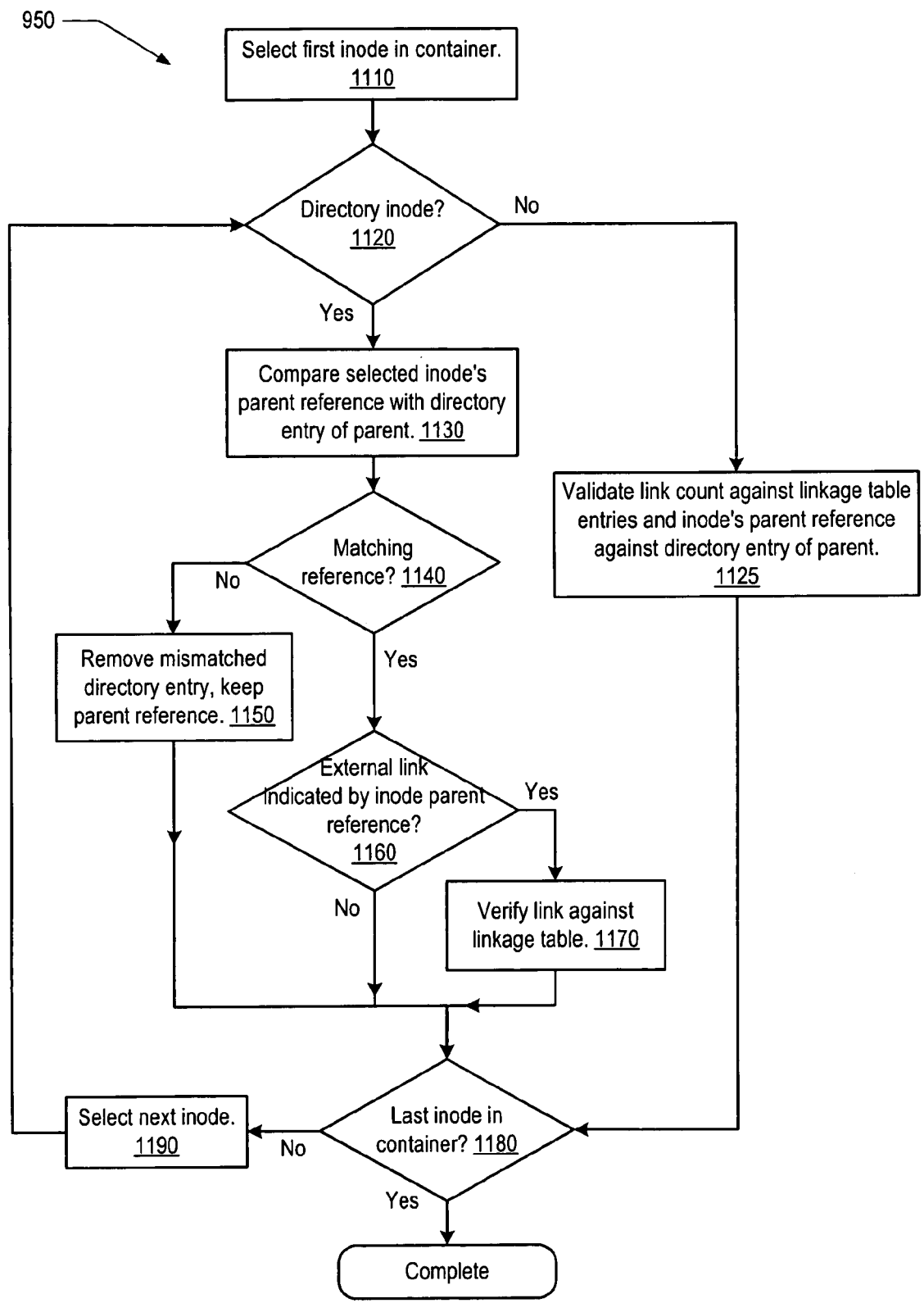
FIG. 11 illustrates one embodiment of a process that may be used to validate data structures that are related to a selected container as well as cross-container references to and from the selected container.

FIG. 11 illustrates one embodiment of a process 950 that may be used to validate data structures that are related to a selected container as well as cross-container references to and from the selected container. Process 950 may begin with selection of a first inode from a selected container's inode directory (block 1110). If the selected inode is not a directory inode, i.e., if the selected inode is a file inode (decision block 1120), then the selected inode's link count may be validated against entries in the selected container's linkage table and the selected inode's parent reference may be validated against the corresponding directory entry of the parent node in the file system directory (block 1125). A more detailed description of one embodiment of a process that may fulfill the functions of block 1125 is given below in the description that accompanies FIG. 13. Upon completion of block 1125, the inode directory may be checked to determine if the selected inode is the last inode of the container that is being verified (decision block 1180). If the selected inode is not the last inode, another inode may be selected (block 1190) and flow may return to block 1120. If the selected inode is the last inode, process 950 is complete.

If the selected inode is a directory inode (decision block 1120), the selected inode's parent reference may be compared with the corresponding directory entry of the parent node in the file system directory (block 1130). If the references do not match (decision block 1140), the mismatch may be resolved via one of a variety of processes. For example, the mismatched directory entry may be removed and the parent reference in the selected inode kept (block 1150). Alternatively, the directory entry may be kept and the parent reference of the selected inode replaced with the value found in the directory entry, or a user may be alerted and asked for input to resolve the mismatch, etc. Once the mismatch has been resolved or if the inode's parent reference and the corresponding directory entry of the parent node in the file system directory match (decision block 1140) and the selected inode's parent reference indicates that the parent inode is not outside the selected container (decision block 1160), flow may proceed to decision block 1180. If the selected inode's parent reference indicates that the parent inode is outside the selected container (decision block 1160), the parent reference may be verified against the selected container's linkage table (block 1170). A more detailed description of one embodiment of a process that may fulfill the functions of block 1170 is given below in the description that accompanies FIG. 12. Upon completion of block 1170, the inode directory may be checked to determine if the selected inode is the last inode of the container that is being verified (decision block 1180). If the selected inode is not the last inode, another inode may be selected (block 1190) and flow may return to block 1120. If the selected inode is the last inode, process 950 is complete.

Figure 12:
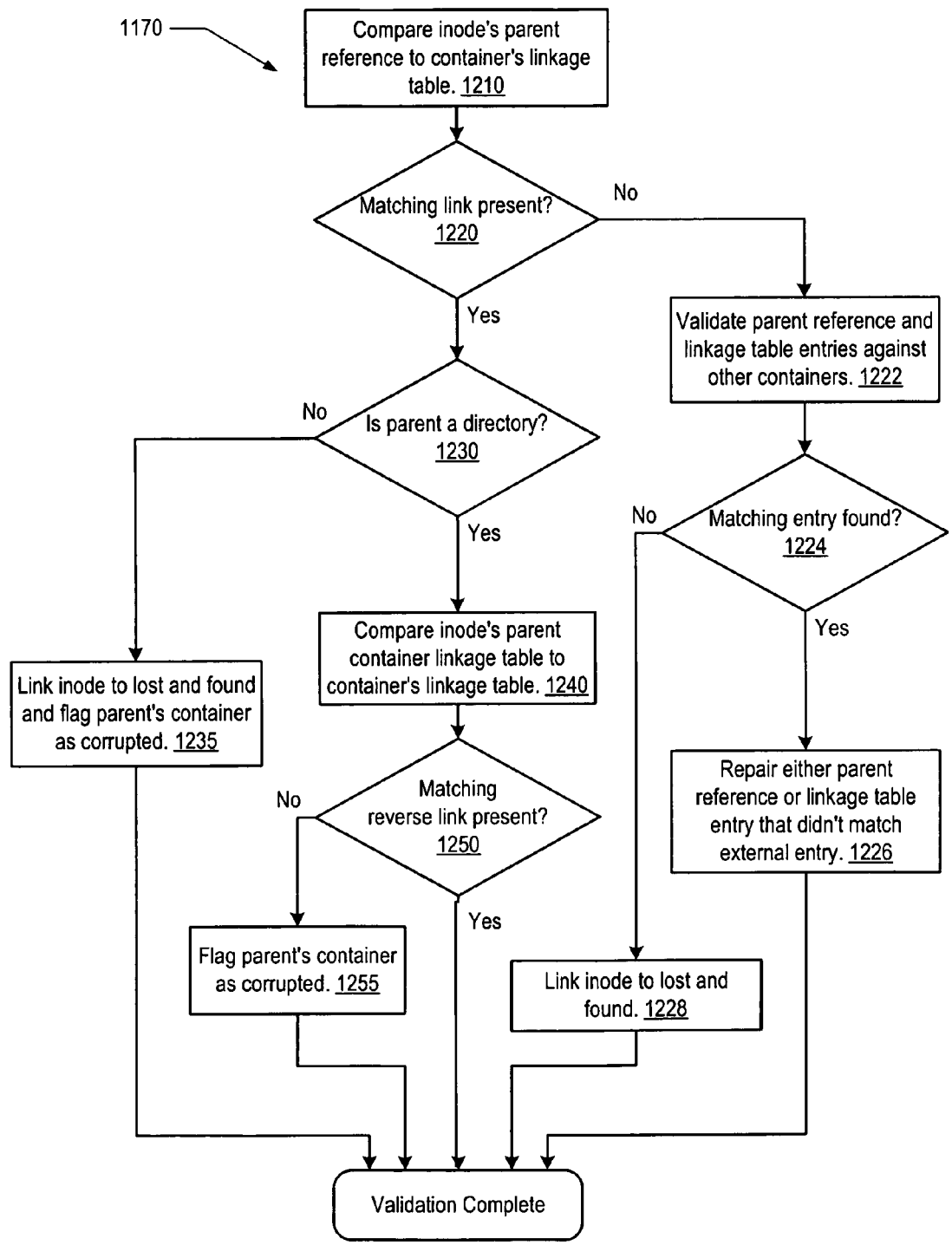
FIG. 12 illustrates one embodiment of a process that may be used to verify an inode parent reference against the inode's container's linkage table.

FIG. 12 illustrates one embodiment of a process 1170 that may be used to verify an inode parent reference against the inode's container's linkage table. Process 1170 may begin with a comparison of the inode parent reference with each entry in the container's linkage table (block 1210). If a matching link is present (decision block 1250) and if the link indicates that the parent inode is not a directory inode (decision block 1230), an error exists. In one embodiment, the selected inode may be linked to a lost and found directory from which it may be recovered by user action. In addition, the inode's parent's container may be flagged as corrupted (block 1235) so that it may be examined for further errors. Upon completion of the functions of block 1235, process 1170 is complete. On the other hand, if a matching link is present (decision block 1250) and if the link indicates that the parent inode is a directory inode (decision block 1230), the inode's parent container's linkage table entries may be scanned to determine if a matching reverse link exists for the entry in the inode's container's linkage table (block 1240). If a matching reverse link is present (decision block 1250), process 1170 is complete. If a matching reverse link is not present (decision block 1250), the inode's parent's container may be flagged as corrupted (block 1255) so that it may be examined for further errors. Upon completion of the functions of block 1255, process 1170 is complete.

If the comparison of the inode parent reference with each entry in the container's linkage table (block 1210) reveals that a matching link is not present (decision block 1250), both the inode's parent reference and the mismatched linkage table entry may be validated against file system directory entries of nodes owned by the inode's parent container (block 1222). If a matching entry is found (decision block 1224), either or both of the inode's parent reference and the mismatched linkage table entry may be repaired using the data found in the file system directory (block 1226). Upon completion of the functions of block 1226, process 1170 is complete. If a matching entry is not found (decision block 1224), the selected inode may be linked to a lost and found directory (block 1228) from which it may be recovered by user action. Upon completion of the functions of block 1228, process 1170 is complete.

Figure 13:
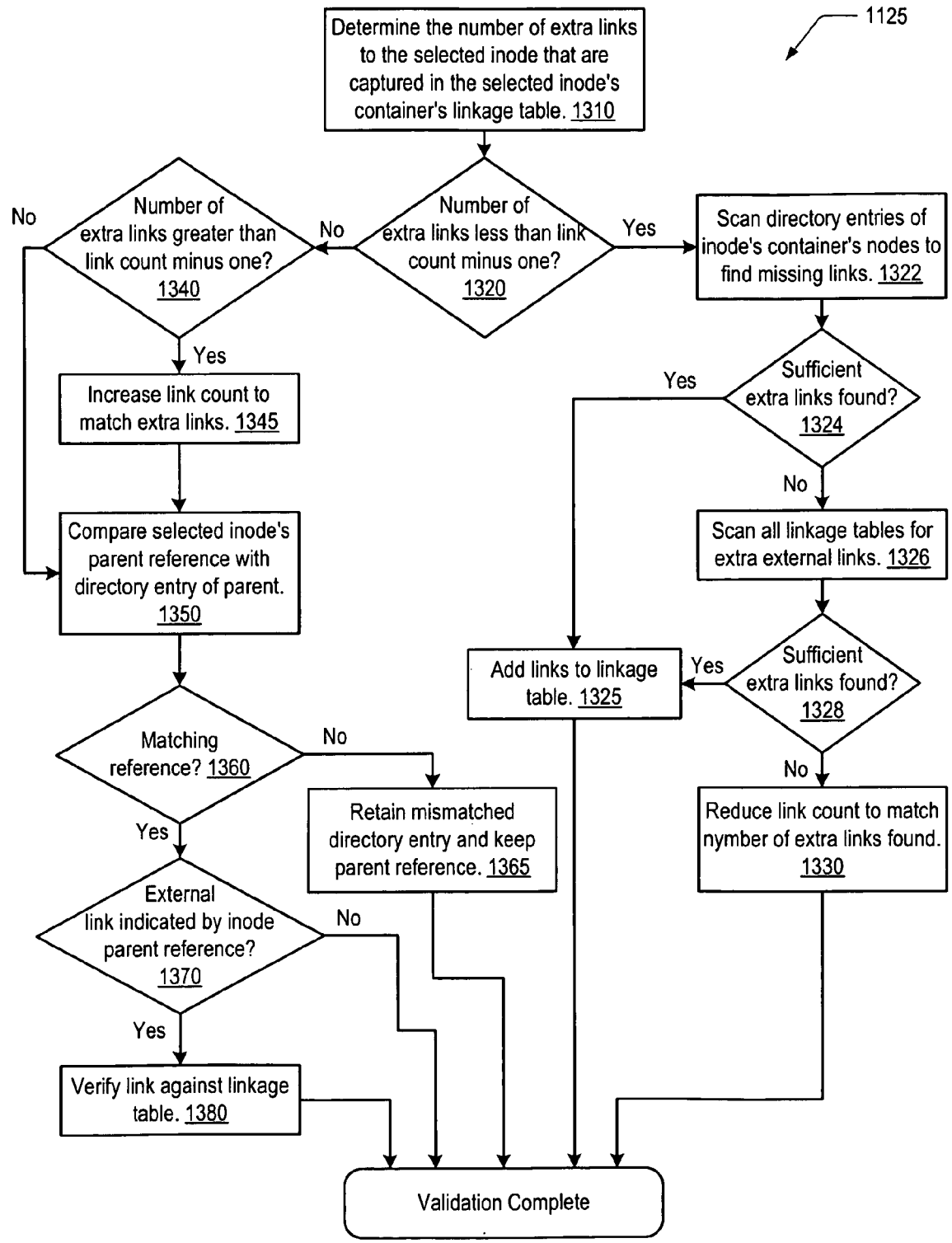
FIG. 13 illustrates one embodiment of a process that may be used to validate a selected inode's link count against entries in the selected container's linkage table and the selected inode's parent reference against the corresponding directory entry of the parent node in the file system directory.

FIG. 13 illustrates one embodiment of a process 1125 that may be used to validate a selected inode's link count against entries in the selected container's linkage table and the selected inode's parent reference against the corresponding directory entry of the parent node in the file system directory. Process 1125 may begin with a comparison of a selected inode's link count and the entries in the inode's container's linkage table (block 1310). If the number of extra links to the selected inode in the linkage table is less than the link count minus one (decision block 1320), entries in the file directory that correspond to the selected inode's container may be scanned to find missing links (block 1322). If a sufficient number of links are found in the file system directory entries (decision block 1324), the links may be added to the linkage table (block 1325) and process 1125 is complete. If a sufficient number of links are not found in the file system directory entries (decision block 1324), entries in the file directory that correspond to the additional containers may be scanned to find missing links (block 1326). If a sufficient number of links are found in these file system directory entries (decision block 1328), the links may be added to the linkage table (block 1325) and process 1125 is complete.

Returning to block 1320, if the number of extra links to the selected inode in the linkage table is not less than the link count minus one and is greater than the link count minus one (decision block 1340), the link count may be increased to match the number of extra links found in the linkage table (block 1345). Once the link count has been increased or if the original link count was equal to the link count minus one (decision block 1340), the parent reference of the selected inode may be compared to the file system directory entries of the parent node (block 1350). If the references match (decision block 1360), and the parent reference refers to an inode owned by the same container as the selected inode (decision block 1370), process 1125 is complete. If the references match (decision block 1360), and the parent reference refers to an inode owned by a different container from that of the selected inode (decision block 1370), the corresponding link may be verified against that container's linkage table (block 1380), after which process 1125 is complete. If the references do not match (decision block 1360), in one embodiment, the mismatched directory entries may be retained since files may have extra links from directories besides their parent. In addition the parent reference may be kept in the selected inode, after which process 1125 is complete.

Figure 14:
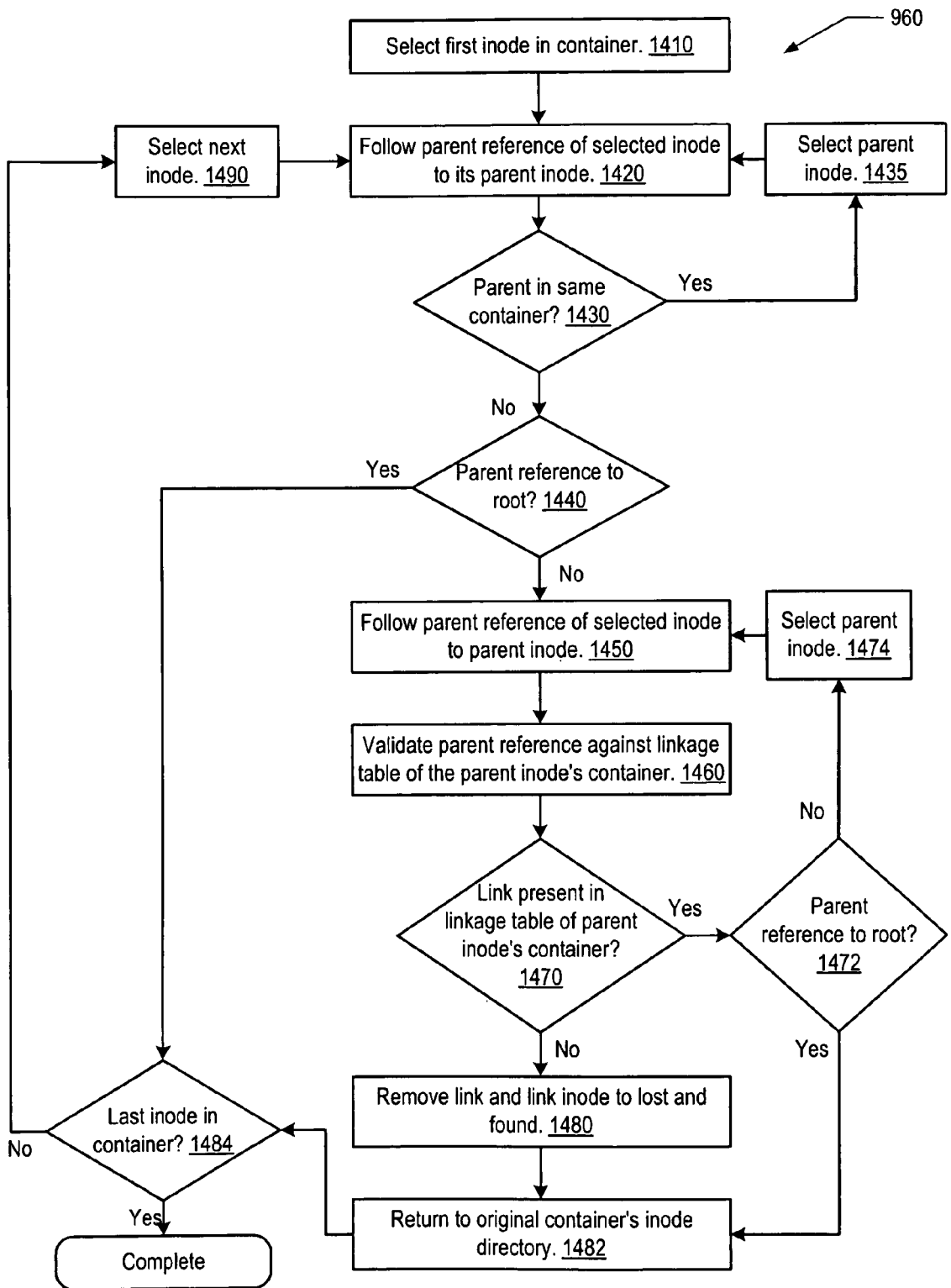
FIG. 14 illustrates one embodiment of a process that may be used to validate an inode hierarchy extending from each inode of a selected container back to the root node of a file system.

FIG. 14 illustrates one embodiment of a process 960 that may be used to validate an inode hierarchy extending from each inode of a selected container back to the root node of a file system. Process 960 may begin with selection of a first inode in the selected container (block 1410). The parent reference of the selected inode may then be followed to the parent's inode (block 1420). If the parent's inode is owned by the same container as the selected inode (decision block 1430), the parent inode may become the selected inode (block 1435) and flow may continue at block 1420. If the parent's inode is not owned by the same container as the selected inode (decision block 1430), and the parent is the root node (decision block 1440), the inode directory may be checked to determine if the selected inode is the last inode of the container that is being verified (decision block 1484). If the selected inode is not the last inode, another inode may be selected (block 1490) and flow may return to block 1420. If the selected inode is the last inode, process 960 is complete. If the parent's inode is not owned by the same container as the selected inode (decision block 1430), and the parent is not the root node (decision block 1440), the parent reference of the selected inode may then be followed to the parent's inode (block 1450). The parent reference may be verified as matching an outbound link in the parent container's linkage table such as via a process analogous to that described above with reference to FIG. 12 (block 1460). If the outbound link is present (decision block 1470) and the parent inode has a parent reference referring to the root node (decision block 1472), process 960 may return to the inode directory of the originally selected container (block 1482). The inode directory may be checked to determine if the selected inode is the last inode of the container that is being verified (decision block 1484). If the selected inode is not the last inode, another inode may be selected (block 1490) and flow may return to block 1420. If the selected inode is the last inode, process 960 is complete. If the outbound link is present and the parent inode has a parent reference referring to an inode other than the root node (decision block 1472), the parent inode may become the selected inode (block 1474) and flow may continue at block 1450. If the outbound link is not present in the parent container's linkage table (decision block 1470), the selected inode's link may be replaced by a link to a lost and found directory (block 1480). Once the link is replaced, process 960 may return to the inode directory of the originally selected container (block 1482). The inode directory may be checked to determine if the selected inode is the last inode of the container that is being verified (decision block 1484). If the selected inode is not the last inode, another inode may be selected (block 1490) and flow may return to block 1420. If the selected inode is the last inode, process 960 is complete.

Figure 15:
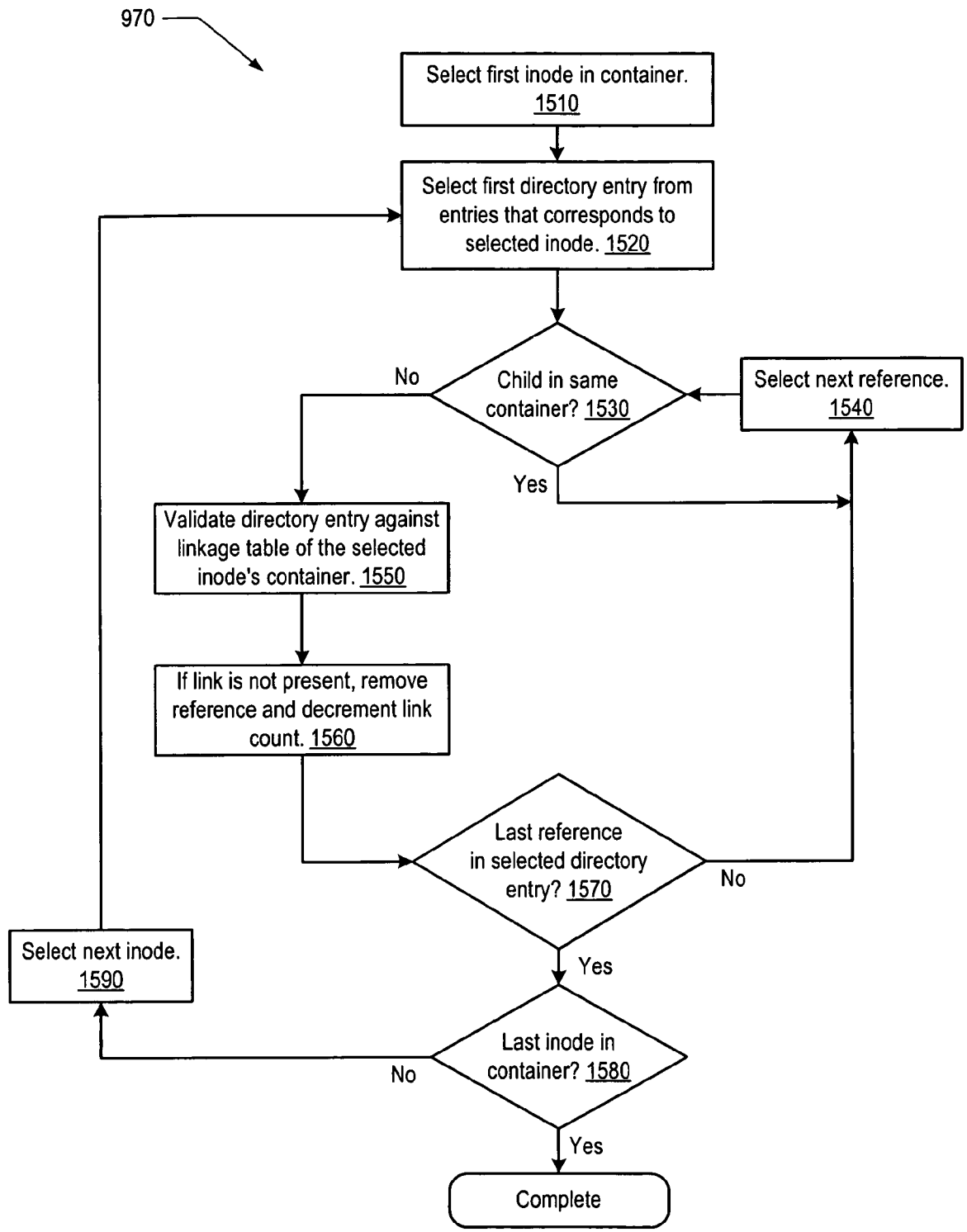
FIG. 15 illustrates one embodiment of a process that may be used to validate outbound references from a selected container's file system directory entries to external files and directories.

FIG. 15 illustrates one embodiment of a process 970 that may be used to validate outbound references from a selected container's file system directory entries to external files and directories. Process 970 may begin with selection of a first inode in the selected container (block 1510). Next, a first directory entry of the file system directory that corresponds to the selected inode may be selected (block 1520). If the first reference in the selected directory refers to a child inode that is in the same container as the container that is being examined (decision block 1530), a next reference may be selected (block 1540) and flow may loop back to decision block 1530, testing each reference in turn. If a reference is found that is not in the same container as the container that is being examined (decision block 1530), the reference may be validated against the selected inode's container's linkage table (block 1550). If the linkage table does not include a corresponding link, the reference may be removed from the directory entry and the link count of the corresponding inode decremented (block 1560). If the reference under examination is not the last reference in the directory entry (decision block 1570), a next reference may be selected for examination (block 1540) and flow may loop back to decision block 1530. If the reference under examination is the last reference in the selected directory entry (decision block 1570), the inode directory may be checked to determine if the selected inode is the last inode of the container that is being verified (decision block 1580). If the selected inode is not the last inode, another inode may be selected (block 1590) and flow may return to block 1520. If the selected inode is the last inode, process 970 is complete.

It is further noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer file system comprising:
a hierarchy of nodes, wherein said hierarchy of nodes is partitioned into a plurality of containers, wherein each of said containers stores one or more of said nodes and wherein a number of said containers is fewer than a number of said nodes;
metadata associated with each node, wherein the metadata includes first metadata (411) that describes each node's references to other nodes and second metadata that identifies each node's parent node; and
wherein in response to detecting that a file system error has occurred, the file system is configured to:
identify a first container which corresponds to the detected error; and
correct inconsistencies in metadata associated with each node owned by the first container, wherein inconsistencies in metadata associated with nodes exclusively owned by the first container may be corrected independently of correcting inconsistencies in metadata associated with nodes exclusively owned by other containers.

2. The system of claim 1, further comprising
a linkage table associated with each container, wherein each linkage table describes links between nodes owned by an associated container and other nodes which are not owned by the associated container;
wherein in response to detecting that a file system error has occurred, the file system is further configured to correct inconsistencies between data in the linkage table associated with the first container and the metadata.

3. The system of claim 2, wherein the first metadata comprises a plurality of entries with a first field, each entry corresponding to one of said nodes, and wherein the second metadata comprises one or more inodes, each inode comprising a parent reference and a mode field;
wherein to correct inconsistencies between the first and second metadata, the file system is further configured to replace at least one value of the field and the value of the mode field in response to determining that the value of the field does not match the value of the mode field.

4. The system of claim 3, wherein to correct inconsistencies between the first and second metadata, the file system is further configured to:
detect a value of a given inode's parent reference;

detect that the first metadata associated with the node to which the parent reference refers does not contain a reference to the node that is associated with the given inode; and add a reference to the node that is associated with the given inode to the first metadata associated with the node to which the parent reference refers.

5. The system of claim 3;

wherein each of the plurality of entries is associated with a respective one of the plurality of inodes; and wherein the linkage table includes a link for each reference to a file other than a parent reference; and wherein the linkage table includes a link for each reference between a directory and a node not owned by the associated container.

6. The system of claim 5;

wherein each inode further comprises a link count;

wherein if a given inode corresponds to a given file in the file system, the link count of the given inode indicates the number of file system directories that refer to the given file; and wherein if the given inode corresponds to a given file system directory, the link count of the given inode indicates the number of file system subdirectories that are linked to the given file system directory.

7. The system of claim 6, wherein to correct inconsistencies between each of the plurality of entries of the linkage table associated with the identified container and the first and second metadata, the file system is configured to:

for a given inode, increase the link count in response to determining that the number of links in the linkage table associated with the given inode is greater than the link count minus one; and for the given inode, decrease the link count in response to determining that the number of links in the linkage table associated with the given inode plus the number of additional links associated with the given inode that are present in other container linkage tables or in the first metadata is less than the link count minus one.

8. A method comprising:

partitioning a file system comprising a hierarchy of nodes into a plurality of containers, wherein each of said containers stores one or more of said nodes and wherein a number of said containers is fewer than a number of said nodes;

maintaining first and second metadata associated with each of said nodes, wherein the first metadata describes each node's references to other nodes and the second metadata identifies each node's parent node;

in response to detecting that a file system error has occurred:

identifying a first container which corresponds to the detected error;

correcting inconsistencies between the first and second metadata associated with each node owned by the first container, wherein inconsistencies in metadata associated with nodes exclusively owned by the first container may be corrected independently of correcting inconsistencies in metadata associated with nodes exclusively owned by other containers.

9. The method of claim 8, further comprising a linkage table associated with each container, wherein each linkage table describes links between nodes owned by an associated container and other nodes which are not owned by the associated container, wherein in response to detecting that a file system error has occurred, the method further comprises correcting inconsistencies between data in the linkage table associated with the first container and the metadata.

10. The method of claim 9, wherein the first metadata comprises a plurality of entries with a first field, each entry corresponding to one of said nodes, and wherein the second metadata comprises one or more inodes, each inode comprising a parent reference and a mode field;

wherein to correct inconsistencies between the first and second metadata, the method further comprises replacing at least one of the value of the field and the value of the mode field in response to determining that the value of the field does not match the value of the mode field.

11. The method of claim 10, wherein correcting inconsistencies between the first and second metadata comprises:

detecting a value of a given inode's parent reference;

detecting that the first metadata associated with the node to which the parent reference refers does not contain a reference to the node that is associated with the given inode; and adding a reference to the node that is associated with the given inode to the first metadata associated with the node to which the parent reference refers.

12. The method of claim 10;

wherein each of the plurality of entries is associated with a respective one of the plurality of inodes; and wherein the linkage table includes a link for each reference to a file other than a parent reference; and wherein the linkage table includes a link for each reference between a directory and a node not owned by the associated container.

13. The method of claim 12;

wherein each inode further comprises a link count;

wherein if a given inode corresponds to a given file in the file system, the link count of the given inode indicates the number of file system directories that refer to the given file; and wherein if the given inode corresponds to a given file system directory, the link count of the given inode indicates the number of file system subdirectories that are linked to the given file system directory.

14. The method of claim 13, wherein correcting inconsistencies between each of the plurality of entries of the linkage table associated with the identified container and the first and second metadata comprises:

for a given inode, increasing the link count in response to determining that the number of links in the linkage table associated with the given inode is greater than the link count minus one; and for the given inode, decreasing the link count in response to determining that the number of links in the linkage table associated with the given inode plus the number of additional links associated with the given inode that are present in other container linkage tables or in the first metadata is less than the link count minus one.

15. A computer readable storage medium storing computer instructions that are executable by a processor to:

partition a file system into a plurality of containers, wherein the file system comprises a hierarchy of nodes, wherein each of said containers stores one or more of said nodes and wherein a number of said containers is fewer than a number of said nodes;

maintain first and second metadata associated with each node, wherein the first metadata describes each node's references to other nodes and the second metadata identifies each node's parent node;

in response to detecting that a file system error has occurred:

identify a first container which corresponds to the detected error;

correct inconsistencies in metadata associated with each node owned by the first container, wherein inconsistencies in metadata associated with nodes exclusively owned by the first container may be corrected independently of correcting inconsistencies in metadata associated with nodes exclusively owned by other containers.

16. The computer readable storage media of claim 15, wherein in response to detecting that a file system error has occurred, the instructions are further executable to wherein correct inconsistencies between data in a linkage table associated with the first container and the metadata, wherein the linkage table describes links between nodes owned by the first container and other nodes.

17. The computer readable storage media of claim 16, wherein the first metadata comprises a plurality of entries with a first field, each entry corresponding to one of said nodes, and wherein the second metadata comprises one or more inodes, each inode comprising a parent reference and a mode field;

wherein to correct inconsistencies between the first and second metadata, the instructions are executable to replace at least one of the value of the field and the value of the mode field in response to determining that the value of the field does not match the value of the mode field.

18. The computer readable storage media of claim 17, wherein to correct inconsistencies between the first and second metadata, the instruction are further executable to cause the processor to:

detect a value of a given inode's parent reference;

detect that the first metadata associated with the node to which the parent reference refers does not contain a reference to the node that is associated with the given inode; and add a reference to the node that is associated with the given inode to the first metadata associated with the node to which the parent reference refers.

19. The computer readable storage media of claim 17;

wherein each of the plurality of entries is associated with a respective one of the plurality of inodes; and wherein the linkage table includes a link for each reference to a file other than a parent reference; and wherein the linkage table includes a link for each reference between a directory and a node not owned by the associated container.

20. The computer readable storage media of claim 19;

wherein each inode further comprises a link count;

wherein if a given inode corresponds to a given file in the file system, the link count of the given inode indicates the number of file system directories that refer to the given file;

wherein if the given inode corresponds to a given file system directory, the link count of the given inode indicates the number of file system subdirectories that are linked to the given file system directory; and wherein to correct inconsistencies between each of the plurality of entries of the linkage table associated with the identified container and the first and second metadata, the instruction are further executable to cause the processor to:

for a given inode, increase the link count in response to determining that the number of links in the linkage table associated with the given inode is greater than the link count minus one; and for the given inode, decrease the link count in response to determining that the number of links in the linkage table associated with the given inode plus the number of additional links associated with the given inode that are present in other container linkage tables or in the first metadata is less than the link count minus one.

* * * * *